US 6,250,656 B1

(12) United States Patent
Ibarra

(10) Patent No.: US 6,250,656 B1
(45) Date of Patent: Jun. 26, 2001

(54) SKATEBOARD-BICYCLE COMBINATION

(76) Inventor: Jorge L. Ibarra, 13546 Silver Lake Dr., Poway, CA (US) 92064

( * ) Notice: Subject to any disclaimer, the term of this patent is extended or adjusted under 35 U.S.C. 154(b) by 0 days.

(21) Appl. No.: 09/323,871

(22) Filed: Jun. 1, 1999

(51) Int. Cl.$^7$ .................................................. B62M 1/00
(52) U.S. Cl. ...................................... 280/87.041; 280/62
(58) Field of Search ............................ 280/87.01, 87.021, 280/87.03, 87.041, 87.042, 12.1, 62

(56) References Cited

U.S. PATENT DOCUMENTS

| 1,367,525 | * | 2/1921 | Foans | 280/87.021 |
| 1,514,720 | * | 11/1924 | Pauly | 280/87.041 |
| 1,516,105 | * | 11/1924 | Kinoshita | 280/87.041 |
| 3,565,454 | * | 2/1971 | Stevenson | 280/87.042 |
| 4,180,278 | * | 12/1979 | Gottlieb | 280/87.042 |
| 4,183,547 | * | 1/1980 | Cohen et al. | 280/87.042 |
| 4,195,857 | * | 4/1980 | Hechinger | 280/87.042 |
| 4,274,647 | * | 6/1981 | Drake, Jr. | 280/87.042 |
| 4,398,734 | * | 8/1983 | Barnard | 280/87.042 |
| 4,958,842 | * | 9/1990 | Chang | 280/87.041 |
| 5,470,089 | * | 11/1995 | Whitson et al. | 280/87.041 |
| 5,620,189 | * | 4/1997 | Hinderhofer | 280/87.041 |

FOREIGN PATENT DOCUMENTS

| 47723 | * | 5/1911 | (DE) | 280/87.041 |
| 126364 | * | 10/1949 | (SE) | 280/87.041 |

* cited by examiner

Primary Examiner—Frank Vanaman
(74) Attorney, Agent, or Firm—John J. Murphey

(57) ABSTRACT

A steerable toy comprising a rigid, elongated footboard defined by an upper surface and front and rear terminal ends and horizontally supported slightly above ground level by a pair of spaced-apart small diameter wheels flexibly journaled thereunder inboard from the rear terminal end to support a rider in standing position, the front end supported above the ground by a large diameter wheel pivotally attached through an articulatable junction connected through an A-frame to the front terminal end of the footboard and steerable with a handle bar assembly in communication with to the wheel and, a flat portion of the footboard aft of the small diameter support wheels pitched upward at an angle to the footboard for stepping on by the rider to pitch the skateboard upward at the small diameter support wheels during certain maneuvers.

9 Claims, 4 Drawing Sheets

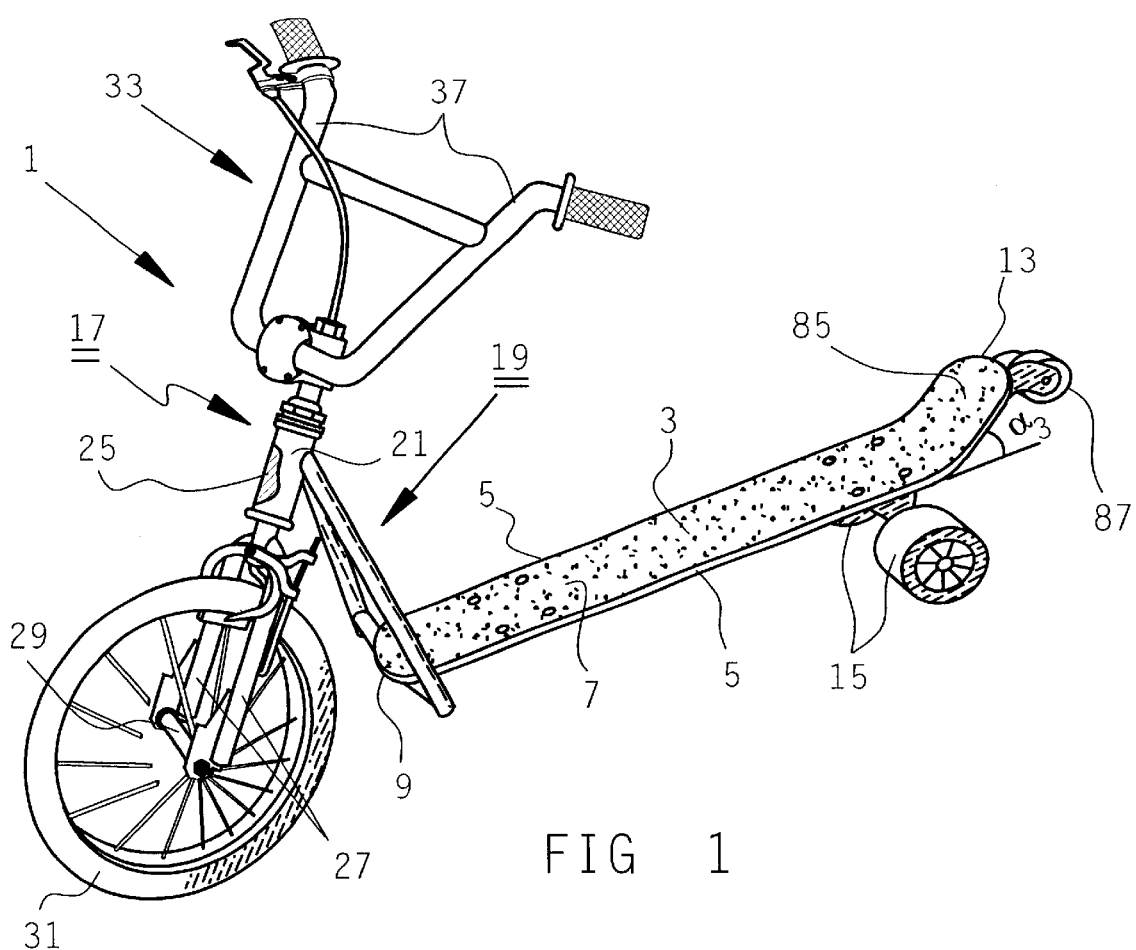
FIG 1
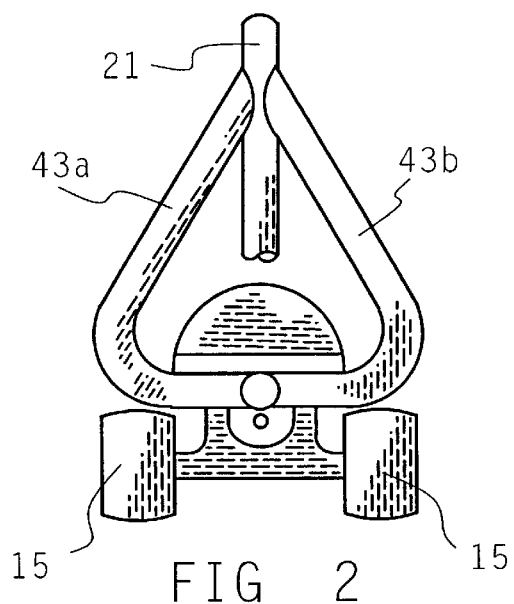
FIG 2
FIG 3

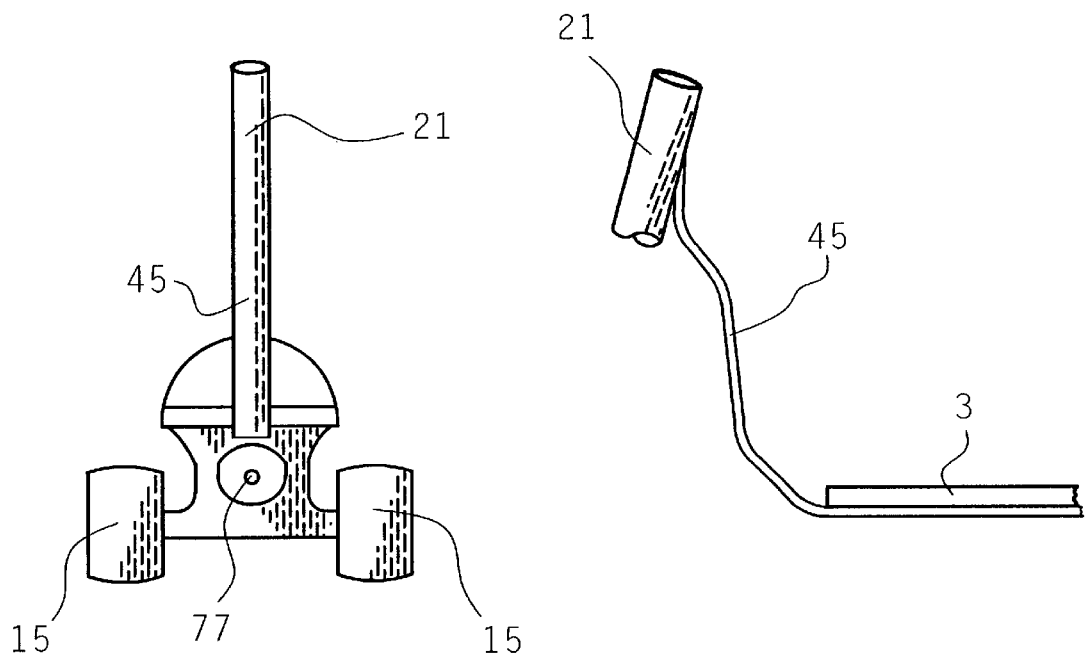
FIG 4
FIG 5
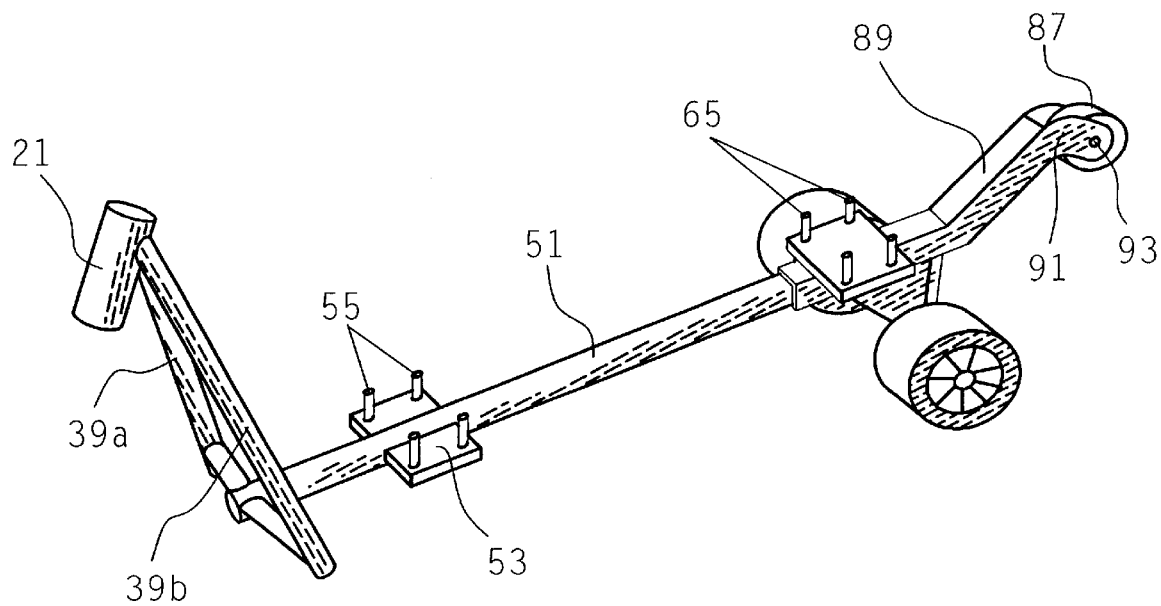
FIG 6

SKATEBOARD-BICYCLE COMBINATION

BACKGROUND OF THE INVENTION

1. Field of the Invention

This invention pertains to the field of self-propelled land dirigibles such as bicycles and skateboards. More particularly, this invention pertains to a novel combination of a bicycle and a skateboard operable by one person to perform numerous tricks and maneuvers not possible with either vehicle alone.

2. Description of the Prior Art

Bicycles have been known for many years and come in a wide variety of wheel diameters, heights, wheel ratios, and lengths such that they are used for exploration, transportation, sports races, and performing entertaining tricks and maneuvers the world over. As is well-known in the use of bicycles, the operator sits upon a seat in the upper portion of the bicycle with both feet off the ground and propels the vehicle by shifting his or her body weight alternatively from foot-to-foot onto a pair of rotatable pedals that are connected by cranks to one of a pair of large, spaced-apart, air-inflated, support wheels by a drive chain or the like. Modern bicycles are equipped with a front and a rear wheel of similar size that are pivotally mounted on cross axles mounted to forks fixed or journaled to the bicycle frame.

Skateboards, on the other hand, have not been known for as many years but currently are quite popular. They are generally long, narrow and usually flat footboards supported by front and rear pairs of small diameter wheel diameters solid rubber wheels to support a rider in standing position quite close to the ground as compared to bicycles. Skateboards come in a rather narrow range of lengths, widths and heights with the wheels being of fairly similar diameters. The operator stands upright on one foot upon the footboard and propels the skateboard by pushing off with the other foot. While bicycles are capable of both short and long trips, skateboards are meant for rather short trips and are generally used to produce tricks in riding, skipping and jumping over obstacles, and leaping off high places or off of inclined surfaces to perform spinning, twisting, and tumbling tricks of spectacular proportion.

There appears to be a general movement to find novel vehicles for the performance of even more sensational tricks and maneuvers using these small vehicles, either in their existing form or in some modified form. For instance, U.S. Pat. No. 1,514,720 discloses a bicycle having a platform located aft of the standard seat for pushing off with one foot and then moving forward to sit on the seat so that the bicycle can be put in motion like a scooter and then ridden like a bicycle. U.S. Pat. No. 1,951,277 discloses a standard scooter having a low center plate supported apart from the ends thereof by a pair of spaced-apart like diameter wheels where the steering is effected by an upright pair of handlebars rising from the front support wheel. U.S. Pat. No. 4,123,079 discloses a scooter-like device with split platforms that articulate with a steerable front support wheel-handlebar combination to provide a mechanically-propellable device. U.S. Pat. No. 4,274,647 discloses a skateboard having a sectional front end that is steerable by a pair of handle bars rising upward from the front small-diameter support wheels through an articulable connection joint. U.S. Pat. No. 5,039,121 discloses a pair of skateboard-like plates angling together at the front of each to an articulable support assembly rising upward to terminate at a pair of steering handles. U.S. Pat. No. 5,620,189 discloses a skateboard plate supported by a trundle of small wheels and terminating at the front thereof by a large diameter wheel through a curved support bar terminating at a steerable joint through a pair of spaced-apart handle bars. And, U.S. Pat. No. 5,785,331 discloses a pair of spaced-apart plates on which a rider stands that are supported by a steerable front support wheel through a set of spaced-apart handlebars that terminate above a moveable support column joining the front wheel to the handlebars.

Continued efforts are being made to find vehicles capable of many different tricks and maneuvers. Each modification that is developed appears to supply the industry with a new and exciting product for development into spectacular tricks that heretofore have not been available to bicycle and skateboard enthusiasts.

SUMMARY OF THE INVENTION

This invention is the melding of a skateboard-type vehicle and a bicycle-type vehicle whereupon the combination provides advantages and opportunities to perform tricks and maneuvers that have not be available alone to either vehicle. The inventor has determined that the footboard portion of the skateboard-type vehicle should be attached to the front bicycle-type wheel through a fitting capable of pivoting about a vertical axis that intersects the central longitudinal axis passing under the footboard from fore to aft so that the steerable front portion of the combination vehicle can be leaned sharply to the left and to the right during use. In addition, the inventor has determined that numerous tricks and maneuvers can be performed on the novel device if a certain length of the footboard, near the rear terminal end thereof, is pitched upward at an angle to the plane of the footboard and supported with a separate wheel located under this terminal end.

More specifically, this invention concerns a steerable toy comprising a rigid, elongated footboard defined by an upper surface and front and rear terminal ends and horizontally supported slightly above ground level by a pair of spaced-apart small diameter wheels flexibly journaled thereunder inboard from said rear terminal end to support a rider in standing position, the front end of the footboard supported above the ground by a large diameter wheel pivotally attached through an articulatable junction connected through A-frame connected to the front terminal end of the footboard and steerable about a near-vertical axis with a handle bar assembly in communication with the large wheel; and, a flat portion of the footboard aft of the small diameter support wheels pitched upward at an angle to the footboard for stepping on by the rider to pitch the entire vehicle upward at the small diameter support wheels during certain maneuvers.

Accordingly, the main object of this invention is a new dirigible toy for children of many ages to ride and enjoy. Other objects of the invention include a toy that combines the versatility of a skateboard with the positive steering capability of a bicycle, a device that allows an easy approach to learning to ride a skateboard as well as a bicycle, a toy on which the rider may performs such tricks as "wheelies", jumps over other objects, and the like while obtaining positive steering of the skateboard through the use of the handlebars, a device that allows more positive steering than the usual manner of steering a skateboard namely by leaning to one side or the other, a toy that allows the rider to effect positive steering at slow speed so as to render the toy safe at slow speeds, and a toy that allows the rider to be supported during maneuvers that require him or her to lean heavily in one direction or another through the A-frame so that the toy remains safe and will not allow the rider to fall over.

These and other objects of the invention will become more clear when one reads the following specification, taken together with the drawings that are attached hereto. The scope of protection sought by the inventor may be gleaned from a fair reading of the claims that conclude this specification.

DESCRIPTION OF THE DRAWINGS

FIG. 1 is a perspective view of the preferred embodiment of the invention;

FIG. 2 is a partial front view of another embodiment of the A-frame of this invention taken along lines 2—2 in FIG. 1;

FIG. 3 is a partial side view of the embodiment shown in FIG. 2;

FIG. 4 is a partial front view of another embodiment of the junction means of this invention taken along lines 2—2 in FIG. 1;

FIG. 5 is a partial side view of the embodiment shown in FIG. 4;

FIG. 6 is a perspective view of the overall frame of the preferred embodiment of this invention shown in FIG. 1;

DESCRIPTION OF THE PREFERRED EMBODIMENTS

Figure 8:
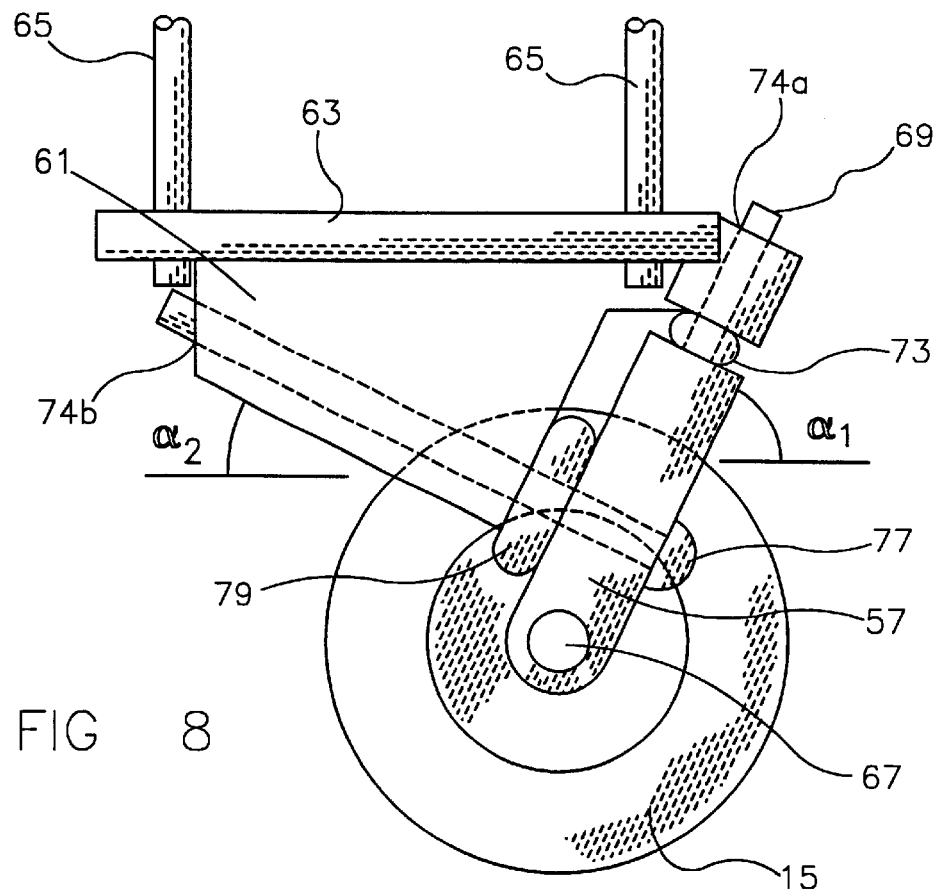
FIG. 8 is a side view of the small diameter wheels and support assembly shown in FIG. 1; and, FIG. 9 is a an illustrative view of a rider using the toy of this invention to perform a maneuver wherein the rear of the skateboard is pitched upward and the support wheel is simultaneously lowered into contact with the surface on which the skateboard is being operated.

Turning now to the drawings wherein elements are identified with numerals, and like elements are identified with like numerals throughout the nine figures, this invention is shown in FIG. 1 to be a steerable toy 1 comprising a rigid, preferably wood elongated dirigible-type footboard 3 bounded by parallel spaced-apart side edges 5, an upper surface 7, usually covered by a layer of rough sand paper-like material known as "Grip Tape" or other non-slip surface, and terminated by spaced-apart, preferably rounded front and rear terminal ends 9 and 13 respectively and horizontally supported about six inches above ground level by a pair of spaced-apart small diameter support wheels 15 flexibly journaled thereunder inboard from said rear terminal end 13 to support a rider in standing position. The width of footboard 3 is sufficient to support the single foot of the rider or both feet in tandem fashion but usually not wider than needed to support both feet in adjacent, side-by-side fashion.

Front end 9 of footboard 3 is also supported above the ground through junction means 17. As shown in FIG. 1, junction means 17 preferably takes the form of an A-frame 19 pivotally attached to an articulative junction or tubular stub 21, arranged in near vertical alignment, throughwhich passes a shaft 25 from which depends a fork 27 supporting a cross axle 29 at the lower ends thereof on which a large diameter wheel 31 is pivotally mounted, usually of typical spoke-type construction, and which is steerable with a handle bar assembly 33 extending upward from shaft 25 to a pair of diverging handle bars 37.

Figure 7:
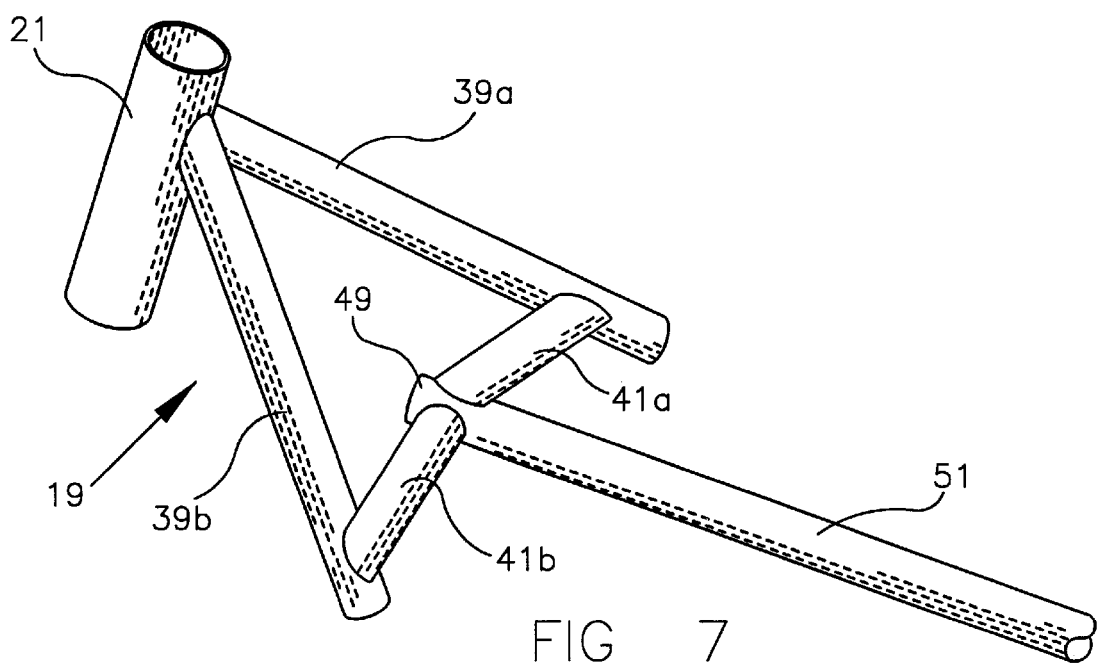
FIG. 7 is a side close-up perspective view of the A-frame shown in FIG. 1.

As shown in FIGS. 1, 6 and 7, A-frame 19 includes a pair of first straight frame members 39a and 39b extending from tubular stub 21 and diverging downward and rearward thereof on opposite sides of footboard front end 9 to terminate at or slightly below the plane of footboard 3 and further includes a pair of second straight frame members 41a and 41b that are attached respectively at one terminal end to one of first straight frame members 39a and 39b and then pass slightly forward and downward to terminate on opposite sides of footboard 3 to form a rigid yet steerable connection between footboard front end 9 and large diameter wheel 31. The term "A-frame 19" also includes the construction shown in FIGS. 2 and 3, where first and second frame members 39a and 41a are collapsed to one member 43a of a pair of curved members and first and second frame members 39b and 41b are collapsed to another member 43b of the pair of curved members each member 43a and 43b beginning at attached tubular stub 21 and continuing downward and outward therefrom, on opposite sides of tubular stub 21, and curving back inward and attaching to the front of footboard 3. As shown in FIGS. 4 and 5, junction means 17 may also include a single length of strap 45 that begins on the back side of tubular stub 21 and curves downward and rearward, about wheel 31, to join the front of footboard 3. In this embodiment, strap 49 is preferably made of steel strap or square tubing or the like. In each case, first straight frame members 39a and 39b, members 43a and 43b, and strap 45 provide a separation between large diameter wheel 31 and footboard front end 9.

As shown in FIG. 6, the steerable toy 1 of this invention can also be considered as having an overall frame comprising tubular stub 21 to which is attached A-frame 19 or strap 45 that is in turn connected to the front end 49 of a stem 51, lying horizontally under footboard 3 from front end 9 to beyond support wheels 15 and attached thereto by flat plate 53 and bolts 55.

First and second straight members 39a–41a, 39b–41b, single pair of curved frame members 43a and 43b as well as single length of curved strap 45 are preferably made of steel and where they are tubing, made of 1½ inch O.D. steel tubing and the connections therebetween are preferably made by welding so that the frame is solid and supportive of both front wheel 31 and footboard 3. A-frame 19 also provides significant strength to toy 1 when the rider leans it to one side or the other during tricks and other eye-catching maneuvers that often place a large amount of stress on the toy. By having first members 39a and 39b and pair of curved members 43a and 43b set at a backward and downward slant, they will take the loads placed on the toy during non-vertical movements and help maintain integrity and directional attitude of the toy.

As shown in FIGS. 6 and 8, small diameter support wheels 15 are flexibly journaled to footboard 3 by an axle plate 57 mounted at an angle to the vertical that is held in a base 61 located under stem 51 that is attached through a flat plate 63 fixed against the underside of stem 51 and connected to footboard 3 by upwardly directed bolts 65 passing through flat plate 63 and terminating on footboard upper surface 7. A pair of axle pins 67 extend outward in opposite directions from the lower portion of axle plate 57 and have mounted thereon small diameter support wheels 15. A first flex pin 69 is shown encased in a flexible bushing 73 passing upward from axle plate 57 through a bore 74a at a rearwardly directed angle $\alpha_1$ to the horizontal formed in base 61 to allow a certain degree of flexibility of axle pins 67 and support wheels 15. A second flex pin 77 is shown encased in a flexible bushing 79 passing upward from axle plate 57 through a second bore 74b at a forwardly directed angle $\alpha_2$ to the horizontal formed in base 61 to allow still another degree of flexibility of axle 67 and wheels 15. Angle $\alpha_2$ is generally orthogonal to angle $\alpha_1$ providing two degrees of freedom to axle pins 67 and thus allowing footboard 3 to be leaned heavily to one side or the other and yet provide adequate support from small diameter wheels 15.

Figure 9:
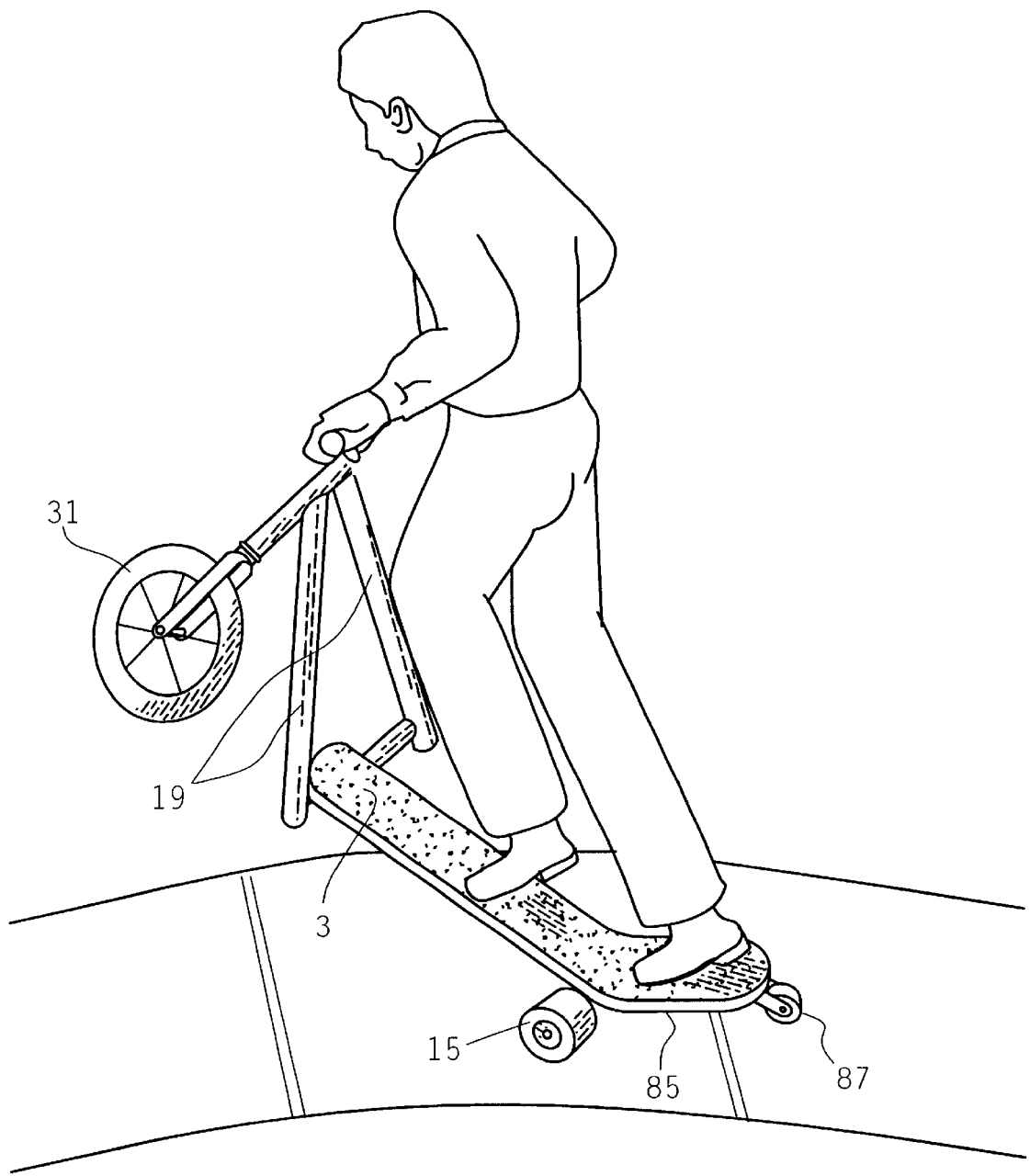

As shown in FIG. 1, of significance in this invention is the establishment of a flat portion 85 of footboard 3, located aft of small diameter support wheels 15 that is pitched upward at an angle $\alpha_3$ to the plane x-y of said footboard for stepping on by the rider to pitch toy 1 upward about small diameter support wheels 15 during certain maneuvers such as shown in FIG. 9. It has been found that flat portion 85 needs to be long enough to support at least the front half of the rider's foot so that his or her foot will not slip off during a maneuver and result in the rider falling down and injuring himself or herself. The preferred angle of the pitch up is between 5° and 20° with the best angle being about 10°.

It is also preferred that a support wheel 87 be located below flat portion 85 with at least a portion of wheel 87 extending beyond the terminal rear end 13 of footboard 3. To insure strength of support, as shown in FIG. 6, stem 51 is fitted with a stem extension 89, preferably in the form of a square tube of steel that begins at small diameter support wheel base 61 and extends rearward, in contact with flat portion 85 to a pair of spaced-apart support ears 91 through-which an axle pin 93 passes on which is pivotally mounted wheel 87. Wheel 87 remains off or above the surface over which toy 1 is propelled during use of toy 1 in a horizontal position, i.e., wherein both front wheel 31 and small diameter support wheels 15 are in contact with the ground. When a maneuver is chosen which calls for a pitching up of toy 1, the rider steps rearward onto flat portion 85 and then wheel 87 descends into contact with the ground and supports toy 1 in a pitched up and rolling attitude.

When toy 1 is to be pitched upward about small diameter support wheels 15, the effect can be amplified by reversing rotating base 61 or turning it 180° to move axle pins 67 further forward under footboard 3. This repositioning of support wheels 15 toward the front of footboard 3 allows the pitch-up of toy 1 to be accentuated.

While the invention has been described with reference to a particular embodiment thereof, those skilled in the art will be able to make various modifications to the described embodiment of the invention without departing from the true spirit and scope thereof. It is intended that all combinations of members and steps which perform substantially the same function in substantially the way to achieve substantially the same result are within the scope of this invention.

What is claimed is:

1. A steerable toy comprising:
   a) a rigid, elongated footboard defined by a planar upper surface and front and rear terminal ends and horizontally supported slightly above ground level by a pair of spaced-apart small diameter support wheels flexibly journaled thereunder inboard from said rear terminal end to support a rider in standing position on said footboard;
   b) junction means joining said front terminal end of said footboard to a large diameter wheel and including a pivotal attachment therebetween connected through an A-frame to said front terminal end of said footboard and steerable with a handle bar assembly in communication with said wheel, wherein said junction means comprises:
      i) a tubular stub arranged in near vertical orientation;
      ii) a shaft defined by upper and lower terminal ends pivotally mounted in said stub;
      iii) a fork, including lower fork ends, depending from said lower terminal end of said shaft and supporting a cross-axle at said lower ends on which said large diameter wheel is pivotally mounted;
      iv) a handle bar assembly extending upward from said upper terminal end of said shaft to a pair of upwardly diverging handle bars for use in steering said toy; and,
   c) a flat extension portion of said footboard aft of said small diameter support wheels pitched upward at an angle to the plane of said footboard surface for stepping on by the rider to pitch said toy upward at said small diameter support wheels during certain maneuvers, wherein said A-frame includes a pair of curved members each extending from the sides of said tubular stub downward, outward and rearward therefrom and curving back inward and connecting to said footboard.

2. A steerable toy comprising:
   a) a rigid, elongated footboard defined by a planar upper surface and front and rear terminal ends and horizontally supported slightly above ground level by a pair of spaced-apart small diameter support wheels flexibly journaled thereunder inboard from said rear terminal end to support a rider in standing position on said footboard;
   b) junction means joining said front terminal end of said footboard to a large diameter wheel and including a pivotal attachment therebetween connected through an A-frame to said front terminal end of said footboard and steerable with a handle bar assembly in communication with said wheel, wherein said junction means comprises:
      i) a tubular stub arranged in near vertical orientation;
      ii) a shaft defined by upper and lower terminal ends pivotally mounted in said stub;
      iii) a fork, including lower fork ends, depending from said lower terminal end of said shaft and supporting a cross-axle at said lower ends on which said large diameter wheel is pivotally mounted;
      iv) a handle bar assembly extending upward from said upper terminal end of said shaft to a pair of upwardly diverging handle bars for use in steering said toy;
   c) a flat extension portion of said footboard aft of said small diameter support wheels pitched upward at an angle to the plane of said footboard surface for stepping on by the rider to pitch said toy upward at said small diameter support wheels during certain maneuvers, wherein said A-frame includes a pair of first frame members extending from the sides of said tubular stub downward and rearward on opposite sides thereof to terminate near the plane of said footboard and a pair of second frame members connecting said first frame members to said footboard;
   d) a stem lying horizontally under and against said footboard and extending from said front terminal end of said footboard to beyond said small diameter support wheels and attached to said footboard; and,
   e) an extension from said stem, underneath said footboard and along said flat portion of said footboard aft of said small diameter support wheels pitched upward at an angle to the plane of said footboard surface and including a cross-axle on which to pivotally mount a further small diameter support wheel.

3. A steerable toy comprising:
   a) a rigid, elongated footboard defined by a planar upper surface and front and rear terminal ends and horizontally supported slightly above ground level by a pair of spaced-apart small diameter support wheels flexibly journaled thereunder inboard from said rear terminal end to support a rider in standing position on said footboard;

b) junction means joining said front terminal end of said footboard to a large diameter wheel and including a pivotal attachment therebetween connected through an A-frame to said front terminal end of said footboard and steerable with a handle bar assembly in communication with said wheel, wherein said junction means comprises:
  i) a tubular stub arranged in near vertical orientation;
  ii) a shaft defined by upper and lower terminal ends pivotally mounted in said stub;
  iii) a fork, including lower fork ends, depending from said lower terminal end of said shaft and supporting a cross-axle at said lower ends on which said large diameter wheel is pivotally mounted;
  iv) a handle bar assembly extending upward from said upper terminal end of said shaft to a pair of upwardly diverging handle bars for use in steering said toy; and, c) a flat extension portion of said footboard aft of said small diameter support wheels pitched upward at an angle to the plane of said footboard surface for stepping on by the rider to pitch said toy upward at said small diameter support wheels during certain maneuvers, wherein said A-frame includes a pair of first frame members extending from the sides of said tubular stub downward and rearward on opposite sides thereof to terminate near the plane of said footboard and a pair of second frame members connecting said first frame members to said footboard.

4. The steerable toy of claim 3 wherein said A-frame extends from said tubular stub at an angle to the vertical rearward to provide separation between said front end of said footboard and said large diameter wheel.

5. A steerable toy comprising:
a) a rigid, elongated footboard defined by a planar upper surface and front and rear terminal ends and horizontally supported slightly above ground level by a pair of spaced-apart small diameter support wheels flexibly journaled thereunder inboard from said rear terminal end to support a rider in standing position on said footboard;

b) junction means joining said front terminal end of said footboard to a large diameter wheel and including a pivotal attachment therebetween connected through an A-frame to said front terminal end of said footboard and steerable with a handle bar assembly in communication with said wheel, wherein said junction means comprises:
  i) a tubular stub arranged in near vertical orientation;
  ii) a shaft defined by upper and lower terminal ends pivotally mounted in said stub;
  iii) a fork, including lower fork ends, depending from said lower terminal end of said shaft and supporting a cross-axle at said lower ends on which said large diameter wheel is pivotally mounted;
  iv) a handle bar assembly extending upward from said upper terminal end of said shaft to a pair of upwardly diverging handle bars for use in steering said toy;

c) a flat extension portion of said footboard aft of said small diameter support wheels pitched upward at an angle to the plane of said footboard surface for stepping on by the rider to pitch said toy upward at said small diameter support wheels during certain maneuvers, wherein said A-frame includes a pair of first frame members extending from the sides of said tubular stub downward and rearward on opposite sides thereof to terminate near the plane of said footboard and a pair of second frame members connecting said first frame members to said footboard; and, d) a stem lying horizontally under and against said footboard and extending from said front terminal end of said footboard to beyond said small diameter support wheels and attached to said footboard;

e) wherein said small diameter support wheels are flexibly mounted to said footboard, said mounting comprising:
  i) a base located below said stem and interconnecting said stem and said footboard;
  ii) an axle plate having a pair of axle pins extending outward in opposite directions therefrom on which are pivotally mounted said small diameter support wheels;
  iii) a first flex pin, encased in a flexible bushing, passing through a first bore formed in said axle plate in a first direction and into one portion of said base for allowing some pivotal movement of said axle plate thereabout; and,
  iv) a second flex pin, encased in a flexible bushing, passing through a second bore formed in said axle plate in a second direction and into another portion of said base for allowing some pivotal movement of said axle plate thereabout; and,
  v) wherein said first flex pin and said second flex pin are set in different angles to the horizontal.

6. The steerable toy of claim 5 wherein the directions of said first flex pin and said second flex pin are orthogonal to each other allow leaning of said toy by the operator from side-to-side without bringing said support wheels off the ground.

7. The steerable toy of claim 5 wherein said mounting is reversible.

8. The steerable toy of claim 5 further including a support wheel positioned below said footboard extension and normally maintained above the ground and adapted to move into contact with the ground when said toy is pitched upward about said small diameter support wheels.

9. An operator-controlled steerable toy comprising:
a) a rigid frame to support a rigid, elongated footboard defined by a planar upper surface, spaced-apart side edges, front and rear terminal ends, with a width sufficient to support at least one foot of a rider in standing position thereon said footboard horizontally supported slightly above ground level by a pair of spaced-apart small diameter support wheels flexibly journaled thereunder inboard from said rear terminal end;

b) junction means joining said front terminal end of said footboard to a large diameter wheel and including a pivotal attachment to said front terminal end of said footboard, said large diameter wheel steerable with a handle bar assembly in communication therewith;

c) a metal strap, attached to the said frame for interconnecting to said handle bar assembly, supporting the operator on said footboard during maneuvers wherein significant leaning of the footboard to one side or the other is required;

d) a rear portion of said footboard, behind said small diameter wheels, pitched upward at an angle to the plane of said footboard for stepping on by the operator during certain maneuvers to pitch said toy upward at an angle to the horizontal;

e) a stem, extending from said metal strap underneath said footboard and aft of said small diameter support wheels pitched upward at an angle to the plane of said footboard and including a cross-axle on which to pivotally mount a further support wheel.

* * * * *